United States Patent
Teglia et al.

(10) Patent No.: US 8,102,997 B2
(45) Date of Patent: Jan. 24, 2012

(54) PROCESSOR FOR EXECUTING AN AES-TYPE ALGORITHM

(75) Inventors: Yannick Teglia, Marseilles (FR); Fabrice Romain, Aix en Provence (FR); Pierre-Yvan Liardet, Peynier (FR); Pasqualina Fragneto, Vitulano (IT); Fabio Sozzani, Vimobrone (IT); Guido Bertoni, Cusano (IT)

(73) Assignees: STMicroelectronics S.A., Montrouge (FR); STMicroelectronics S.r.l., Agrate Brianza (IT)

( * ) Notice: Subject to any disclaimer, the term of this patent is extended or adjusted under 35 U.S.C. 154(b) by 786 days.

(21) Appl. No.: 11/547,195

(22) PCT Filed: Mar. 29, 2004

(86) PCT No.: PCT/FR2004/050133
§ 371 (c)(1),
(2), (4) Date: Jul. 28, 2008

(87) PCT Pub. No.: WO2005/107138
PCT Pub. Date: Nov. 10, 2005

(65) Prior Publication Data
US 2008/0285745 A1    Nov. 20, 2008

(51) Int. Cl.
*H04L 9/28* (2006.01)
*H04K 1/00* (2006.01)
(52) U.S. Cl. .......................................... 380/29; 380/37
(58) Field of Classification Search ............ 380/29, 380/37
See application file for complete search history.

(56) References Cited

U.S. PATENT DOCUMENTS

| 7,106,860 | B1 * | 9/2006 | Yu et al. ........................... 380/37 |
|---|---|---|---|
| 2003/0039355 | A1 * | 2/2003 | McCanny et al. ............... 380/37 |
| 2003/0048903 | A1 * | 3/2003 | Ito et al. ......................... 380/263 |
| 2003/0068036 | A1 | 4/2003 | Macchetti et al. |
| 2003/0099352 | A1 | 5/2003 | Lu et al. |
| 2003/0133568 | A1 | 7/2003 | Stein et al. |
| 2004/0028224 | A1 * | 2/2004 | Liardet et al. ................... 380/37 |
| 2004/0071288 | A1 * | 4/2004 | Romain et al. .................. 380/37 |
| 2004/0184602 | A1 * | 9/2004 | Nadehara ........................ 380/28 |
| 2004/0208318 | A1 * | 10/2004 | Henry et al. .................... 380/46 |
| 2004/0228481 | A1 * | 11/2004 | Crispin et al. .................. 380/28 |
| 2006/0177052 | A1 * | 8/2006 | Hubert ............................ 380/29 |

OTHER PUBLICATIONS

Charot, Francois et al. "Efficient Modular-Pipelined AES Implementation in Counter Mode on ALTERA FPGA", 2003.*

(Continued)

*Primary Examiner* — Michael Simitoski
(74) *Attorney, Agent, or Firm* — Lisa K. Jorgenson; James H. Morris; Wolf, Greenfield & Sacks, P.C.

(57) ABSTRACT

A processor for executing a Rijndeal algorithm which applies a plurality of encryption rounds to a data block array in order to obtain an array of identical size, each round involving a key block array and a data block substitution table, wherein said processor comprises: a first input register (102) containing an input data block column; an output register (111) containing an output data block column or an intermediate block column; a second input register (101) containing a key block column or the intermediate data blocks; a block substitution element (104) receiving the data one block at a time following the selection (103) thereof in the first register and providing, for each block, a column of blocks; an element (109) applying a cyclic permutation to the substitution circuit column blocks; and an Exclusive-OR combination element (110) combining the permutation circuit column blocks with the content of the second register, the result of said combination being loaded into the output register.

27 Claims, 4 Drawing Sheets

OTHER PUBLICATIONS

Chodowiec, Pawel et al. "Very Compact FPGA Implementation of the AES Algorithm" (LNCS 2779), 2003.*

Hodjat, Alireza et al. "High-Throughput Programmable Cryptocoprocessor", 2004 IEEE.*

Kuo, Henry et al. "A 2.29 Gbits/sec, 56 mW Non-Pipelined Rijndael AES Encryption IC in a 1.8V, 0.18 mm CMOS Technology", 2002.*

Pramstaller, Norbert et al. "A Universal and Efficient AES Co-processor for Field Programmable Logic Arrays", 2004.*

Schaumont, Patrick R. et al. "Unlocking the Design Secrets of a 2.29 Gb/s Rijndael Processor", Jun. 2002.*

Shim, Joon Hyoung et al. "A Rijndael Cryptoprocessor Using Shared On-the-fly Key Scheduler", 2002 IEEE.*

Su, Chih-Pin et al. "A High-Throughput Low-Cost AES Processor", 2003 IEEE.*

International Search Report from corresponding International Application No. PCT/FR2004/050133, filed Mar. 29, 2004.

Stallings, W., *The Advance Encryption Standard*, Cryptologia, United States Military Academy, West Point, NY, vol. 26, No. 3, Jul. 2001, pp. 165-188, XP001094868.

* cited by examiner

PROCESSOR FOR EXECUTING AN AES-TYPE ALGORITHM

BACKGROUND OF THE INVENTION

1. Field of the Invention

The present invention relates to the ciphering of digital data by means of algorithms intended to mask the original data to make them undetectable by a possible hacker. The present invention more specifically relates to an algorithm known as Rijndael implementing a same transformation on different portions of data to be ciphered, and among these, the AES algorithm (Advanced Encryption Standard, FIPS PUB 197) where the size of the data blocks is set to 128 bits.

Such an algorithm is generally executed by integrated circuits either by means of state machines in wired logic, or by means of microprocessors executing a program in the memory (generally, a ROM). The algorithm uses secret keys specific to integrated circuits or to the user, which are exploited by the algorithm to cipher the data. More specifically, the AES algorithm applies, to a data word or code divided into blocks, a same transformation several times in a row based on different ciphering sub-keys (more specifically on portions of a binary word forming a key). An example of application of the present invention is the use of such an algorithm in electronic elements of smart card type.

2. Discussion of the Related Art

FIG. 1 illustrates, in a simplified timing diagram, the main steps of an AES-type algorithm. Only the ciphering will be described, the deciphering using the inverse transformations. For more details, reference may be made to work "The Design of Rijndael" by Joan Daemen and Vincent Rijmen, published by Springer-Veriag (ISBN 3-540-42580-2) and to the AES standard (FIPS PUB 197).

This algorithm ciphers a word or code $S_0$ of a predetermined number of bits (128 bits for the AES) into another word or code $S_n$ of the same size. The data to be processed are actually formed of several words or codes resulting from a previous division of the data into words all having the same size. The ciphering and the deciphering rest on a secret key having a length (128, 192, or 256 bits for the AES) which conditions the ciphering security.

In practice, each step of an AES-type algorithm processes a matrix of four lines and four columns, representing a word, and each element of which is a byte or block of the processed 128-bit code. To simplify the following description, reference will be made, for each step, to a state considered as being a matrix.

The invention will be described in relation with an AES-type algorithm applied to 32-bit words divided into bytes, which corresponds to the most frequent case.

To implement the ciphering or deciphering algorithm, it is started by generating, based on the secret key over 128, 192, or 256 bits, respectively 11, 13, or 15 sub-keys, each also comprising 128 bits. The sub-keys are intended to be used by the algorithm as will be described in relation with FIG. 1.

It is started from an initial state (block 1, STATE INIT) S of the data code or word to be ciphered.

A first phase of the ciphering method is an operation (block 2, ADDROUNDKEY) which comprises performing an XOR-type combination of initial state S with first sub-key $K_0$. A first intermediary state $S_1$ is obtained.

A second phase of the ciphering method comprises performing several rounds or cycles of a same transformation T involving, at each round, the state $S_{i-1}$ obtained at the preceding round and a current sub-key $K_i$. The number of rounds of transformation T corresponds to n−1, that is, to number n+1 of derived sub-keys, minus 2.

Each round transformation T is formed of four successively-applied operations.

FIG. 2 illustrates in further detail these four operations on a matrix 20 of four lines and four columns of bytes to which an AES-type algorithm applies.

A first operation (block 3, SHIFTROWS) comprises performing a rotation on the last three lines of matrix 20. First line 201 of matrix 20 remains unchanged. Second line 202 undergoes a rotation by one byte. Third line 203 undergoes a rotation by two bytes. Fourth line 204 undergoes a rotation by three bytes.

A second operation (block 4, SUBBYTES) of round transformation T is a non-linear transformation in which each byte of matrix 20' forming the current state is replaced by its image, generally taken from a precalculated substitution box (SBOX). As illustrated in FIG. 2, substitution box SBOX can be obtained by two combined transformations. A first transformation (block 41, INV) comprises inverting the considered byte (the element of matrix 20') in the finite field of order $2^8$ (to correspond to the byte), byte 00 forming its own image. This inversion is followed by an affine transformation (block 42, AFFINE).

The first and second operations may be inverted.

A third operation (block 5, MIXCOLUMNS) of round transformation T comprises considering each column of matrix 20" resulting from the previous step as a polynomial on the finite field of order $2^8$, and multiplying each of these polynomials by a combination polynomial P[X] modulo a polynomial M[X].

A fourth and last operation (block 6, ADDROUNDKEY) of round transformation T of rank i comprises applying sub-key $K_i$ to the resulting matrix 20" of the preceding state to obtain a matrix 20'" in which each byte of matrix 20" has been combined by XOR, bit-to-bit, with a byte $K_i(j,l)$—with j ranging between 0 and 3 (rank of the line in the matrix) and l ranging between 0 and 3 (rank of the column in the matrix)— of sub-key $K_i$. This operation 6 is the same as operation 2 of the first ciphering phase, but performed with a different sub-key.

At the end of operation 6, for a round of rank i, a state $S_i=T(K_i, S_{i-1})$ is obtained. The four operations of the round transformation are repeated n−1 times, that is, after operation 6, it is returned to operation 3 to perform a new round with a next sub-key.

The third phase of the AES ciphering algorithm (FIG. 1) comprises a last round slightly modified with respect to that illustrated in FIG. 2. In fact, operations of the round transformation are reproduced except for the third one (MIXCOLUMNS). In FIG. 1, this last round has been illustrated by blocks 7, 8, and 9 resuming the previously-described operations of blocks 3, 4, and 6 with, as a key for operation 9, last sub-key $K_n$.

State $S_n=T'(K_n, S_{n-1})$ is then obtained. This result may be shaped up (block 10, RESULT FORM) for subsequent use.

The critical part in terms of storage of an AES-type algorithm lies in the execution of step SUBBYTE (blocks 4 and 8) using a substitution box. This table generally represents a 256-byte matrix that must be pre-calculated, then read from a storage memory 16 times on each round of the AES algorithm.

Another possible solution comprises storing a table with the results of substitution box SBOX and of the column transformation (MIXCOLUMNS). The stored table and the results of the two transformations are applied to a byte of each state. A disadvantage is that the size of this table is then equal to 210 bytes.

Another problem of known AES-type algorithms is linked to their sensitivity to attacks by analysis of the current consumption of the circuit executing the algorithm. Such an attack known as a DPA (Differential Power Analysis) comprises correlating the consumption of the integrated circuit executing the algorithm with calculation results involving the secret keys used on ciphering or deciphering. In practice, from a message to be ciphered and assumptions as to the secret key, a curve of statistic time correlation between the consumption of the product for the message ciphering and an intermediary value calculated by the circuit is established. Such consumption attacks are described in literature (see, for instance, article "Differential Power Analysis" by Paul Kocher, Joshua Jaffe, and Benjamin Jun, published in 1999, CRYPTO 99 conference, pages 388 to 397, Springer-Verlag LNCS 1666).

Examples of circuits implementing or using the AES algorithm to cipher/decipher data are described in documents US-A-2003/0133568, US-A-2003/0068036, and US-A-2003/0099352.

According to a first aspect, the present invention aims at providing a novel architecture of a circuit for executing an algorithm of AES-type, or more generally of Rijndael type, which is less bulky than conventional architectures.

The invention also aims at providing an architecture enabling execution of all the rounds of the algorithm by means of a same group of hardware operators.

The invention also aims at reducing the memory size necessary for storing the tables.

The invention also aims at providing a solution which is compatible with the execution of the AES-type algorithm by a state machine in wired logic in an integrated circuit.

According to a second aspect, the present invention provides introducing at least one random value into the execution of the AES-type algorithm to make it resistant against attacks of differential power analysis type.

SUMMARY OF THE INVENTION

To achieve these and other objects, the present invention provides a processor for executing a Rijndael-type algorithm, performing several rounds of ciphering or deciphering of an initial matrix formed of data blocks of identical size to obtain a resulting matrix of same size, each round implying a matrix of blocks of ciphering or deciphering keys of same size as the data blocks, and a data block substitution box, comprising:

a first input register to contain a column of round input data blocks;

an output register to contain a column of transformed round output data blocks or an intermediary data block column;

a second input register to contain either a key block column, or the intermediary data blocks of the output register;

an element of block substitution based on a substitution box loaded into a memory, said substitution element receiving the data block by block after selection from the first register and providing, for each block, a block column;

a controllable element of circular permutation of the blocks of the substitution circuit column; and an element of XOR-type bit-to-bit combination of the block column provided by the permutation circuit with the content of the second register, the result of the combination being loaded into the output register.

According to an embodiment of the present invention, the second register receives a column of blocks of keys on each loading of a new data block column into the first register, and an intermediary data block column otherwise.

According to an embodiment of the present invention, the operations performed by said elements are performed, at each round, as many times as there are blocks in the state matrix.

According to an embodiment of the present invention, said substitution element comprises:

a first element of block-by-block substitution based on said table;

a second element of expansion of a block provided by said first element into a block column; and a series of elements of multiplication, block-by-block, of the column provided by said second element.

According to an embodiment of the present invention, said series of multiplication elements and said circular permutation element are deactivated at the last ciphering or deciphering round.

According to an embodiment of the present invention, the processor further comprises means for masking the execution of the round transformations with at least one random quantity.

According to an embodiment of the present invention, the processor comprises masking elements for combining by an XOR-type function the block applied to the substitution element with at least one first number having the size of said block.

According to an embodiment of the present invention, said substitution element uses a table calculated with a second random number of same length as the first number, said table respecting the fact that the substitution of an input block, previously combined by XOR with the second random number, corresponds to the result of the combination by XOR of this input code with said first random number.

According to an embodiment of the present invention, the sub-keys are masked before introduction into the second register, by third random data of the size of a column, also combined with an XOR-type function with said block applied to the substitution element.

According to an embodiment of the present invention, fourth and fifth random data are combined by XOR-type functions, respectively with the block provided by the substitution element and with the block combined by the third random data.

According to an embodiment of the present invention, said elements are at least partially software elements.

According to an embodiment of the present invention, said elements are at least partially hardware elements.

BRIEF DESCRIPTION OF THE DRAWINGS

The foregoing objects, features, and advantages of the present invention, as well as others, will be discussed in detail in the following non-limiting description of specific embodiments in connection with the accompanying drawings, among which.

DETAILED DESCRIPTION

Figure 1:
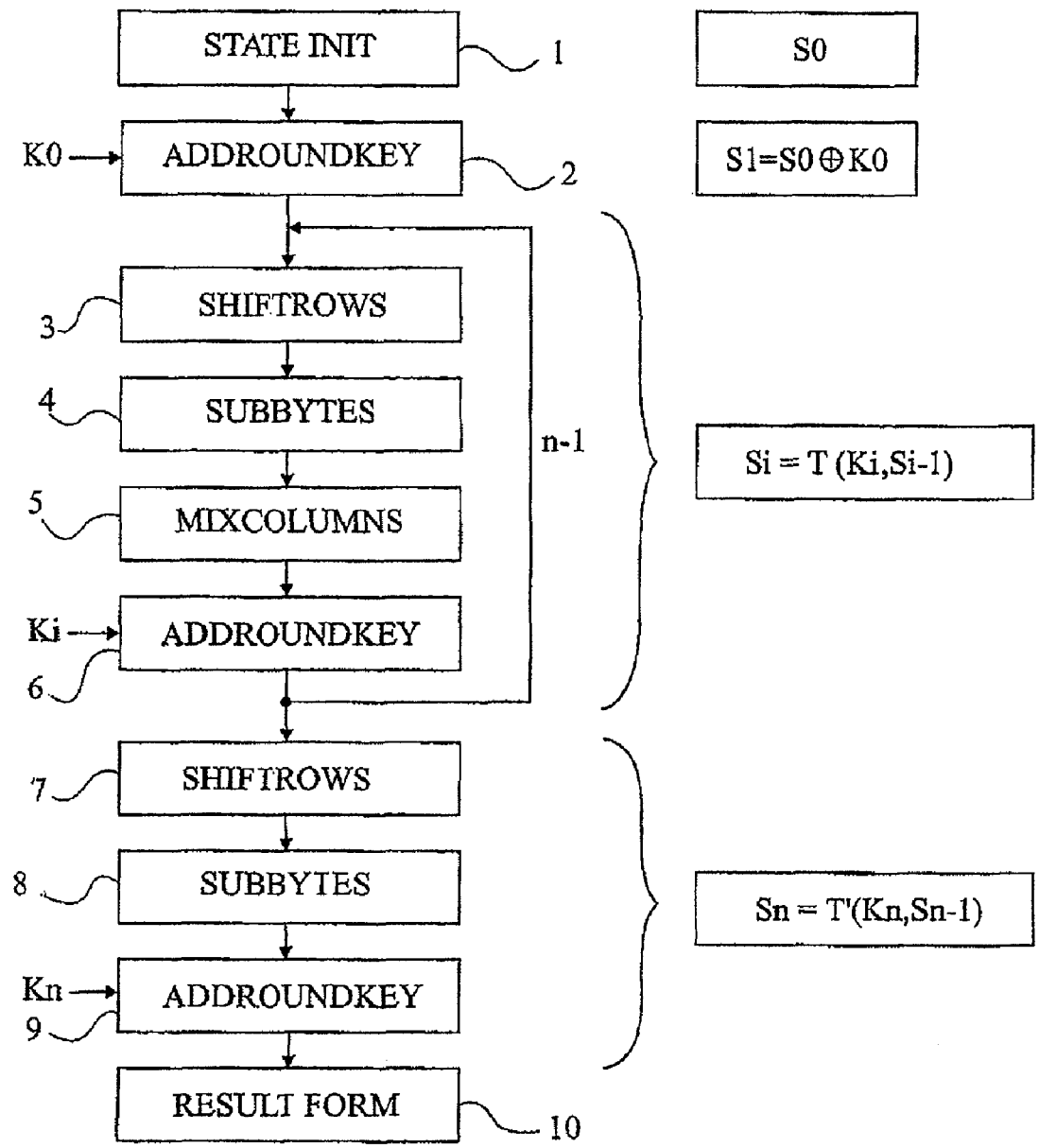
FIGS. 1 and 2, previously described, are intended to show the state of the art and the problem to solve.

The same elements have been designated with the same reference numerals in the different drawings. For clarity, only those elements which are necessary to the understanding of the invention have been shown in the drawings and will be described hereafter. In particular, the circuits executing the invention have not been described in detail and use known means. Similarly, the invention will be described by referring to a hardware or software terminology, knowing that its implementation may be partially or totally performed by software means.

A feature of the present invention is to organize the loading of the different operands of an AES-type algorithm in specific fashion to enable sharing of the same operators for several operations of the algorithm. More specifically, the invention provides performing, byte by byte, the calculation steps from the byte substitution operation (SUBBYTES) to and including the column mixing operation (MIXCOLUMNS).

Figure 3:
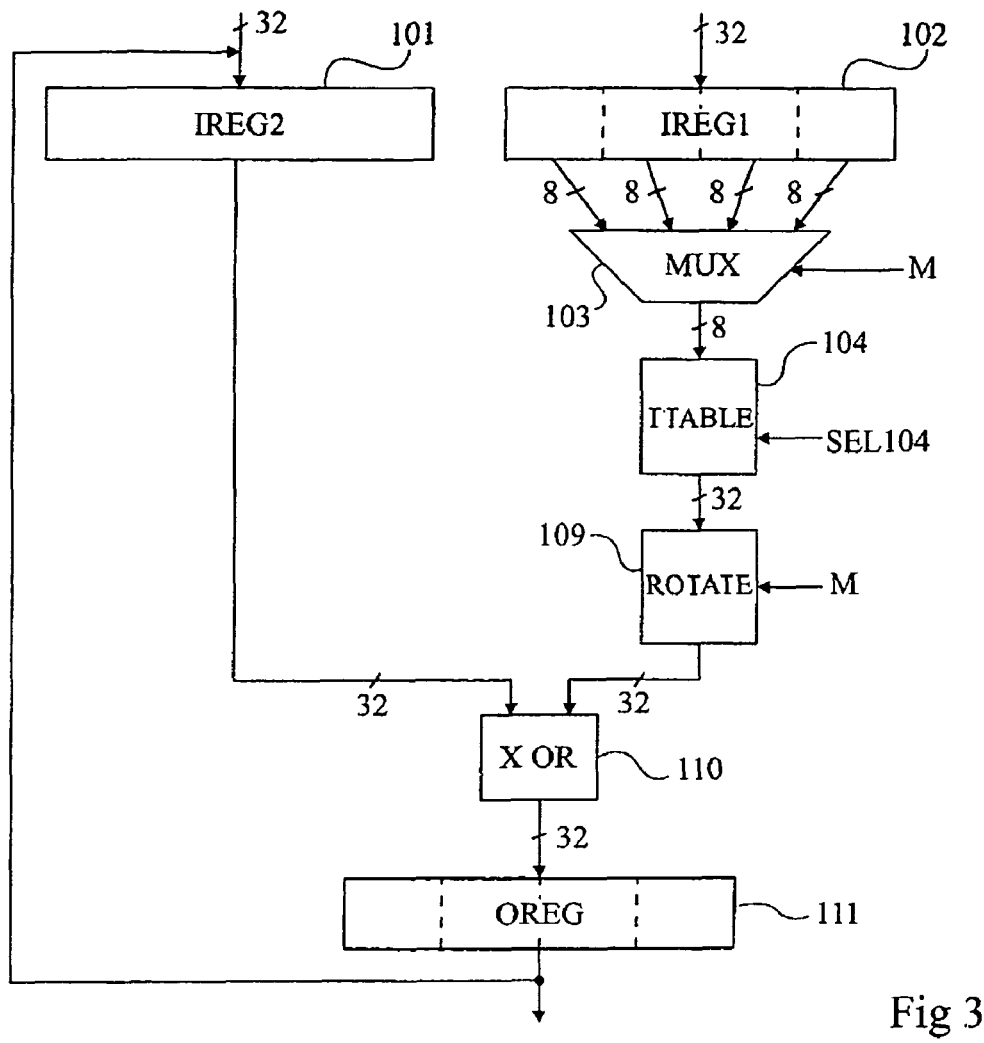
FIG. 3 very schematically shows in the form of blocks an embodiment of a circuit according to the invention for executing the operations of a round transformation of an AES-type algorithm.

FIG. 3 very schematically shows in the form of blocks an embodiment of a circuit according to the invention for executing the steps of a round transformation exploiting an AES-type algorithm.

Figure 2:
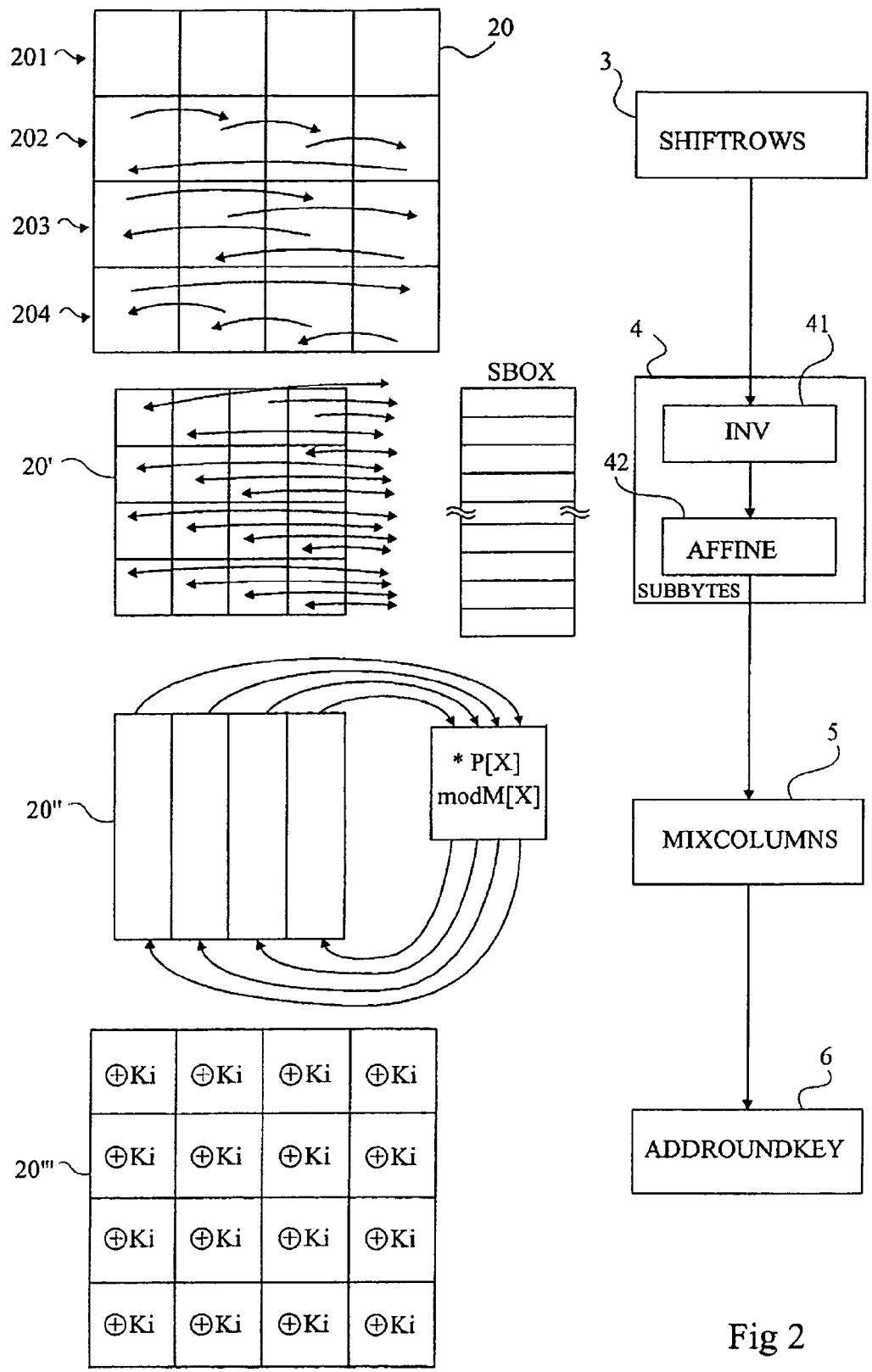

Referring to the discussion of FIGS. 1 and 2 hereabove, FIG. 3 thus shows a circuit capable of executing the operations of column shifting (SHIFTROWS), of byte substitution (SUBBYTES), of column mixing (MIXCOLUMNS), and of introduction of the round sub-key (ADDROUNDKEY).

According to the present invention, the above operations are no longer performed successively for an entire byte matrix, but are nested based on a specific cutting up. This requires coding the entire round transformation table (SBOX).

The present invention will be described in relation with an example of application to the AES algorithm with 128-bit state matrixes (4 byte lines and 4 byte columns) but more generally applies to any application conformal to a Rijndael algorithm.

In the following description, the following notations will be adopted to designate the different processed digital data.

i designate the round of the AES algorithm (with i ranging between 1 and n—generally, n=10);

$S_i$ designates the state machine of the round to come (corresponding to the state machine obtained at the end of the round of rank i−1) comprising 4 lines or 32-bit words, each formed of 4 bytes designated as $s_i(j,l)$, with j ranging between 0 and 3 (rank of the line in the matrix) and l ranging between 0 and 3 (rank of the column in the matrix); and $K_i$ designates the 128-bit matrix forming the sub-key to be used in the round transformation of rank i, comprising 16 bytes designated as $k_i(j,l)$.

The structure of the circuit of FIG. 3 will first be described before explaining its operation.

This circuit comprises two input registers 101 (IREG2) and 102 (IREG1) intended to be loaded, at each round i of the AES algorithm, with two words of 32 bits each. Register 101 initially receives (at the beginning of a round) the first column of sub-key $K_i$ (bytes $k_i(0,1)$, $k_i(1,1)$, $k_i(2,1)$, and $k_i(3,1)$) and register 102 receives, by line of four bytes $s_i(j,0)$, $s_i(j,1)$, $s_i(j,2)$, and $s_i(j,3)$, the data of state machine $S_i$. Each byte of register 102 is separately sent to one of four inputs of a multiplexer 103. Multiplexer 103 provides bytes S(j,l) one by one to a table transformation block 104 (T TABLE). Block 104, characteristic of the invention, contains substitution box SBOX of the AES algorithm.

Figure 4:
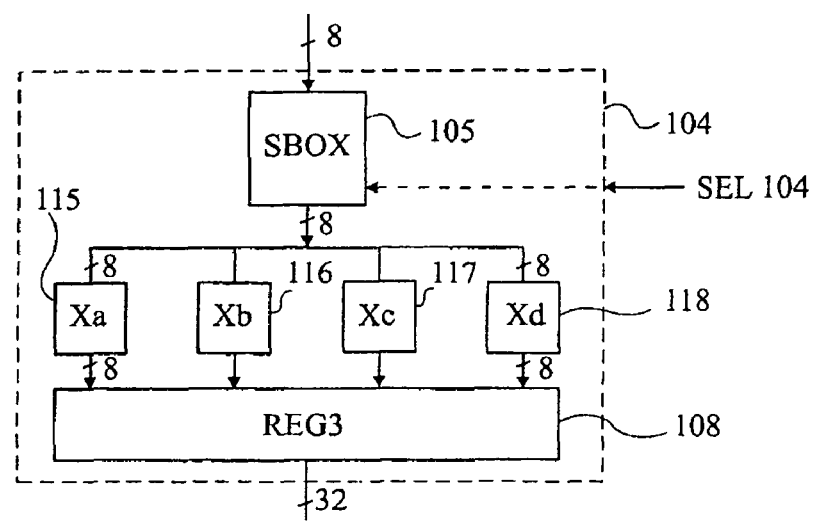
FIG. 4 shows a detail of the call to a round transformation table according to an embodiment of the present invention.

FIG. 4 shows the detail of block 104 of FIG. 3 according to a preferred embodiment of the invention. This block 104 is intended to successively perform, for each byte which is provided thereto by multiplexer 103, a substitution by another byte based on a stored substitution box 105 (SBOX). In the case of the deciphering, the used substitution box is inverted with respect to table SBOX and is generally noted $SBOX^{-1}$. Then, the byte provided by box 105 is multiplied by a line matrix of value a, b, c, d symbolized by four multipliers 115 to 118 to obtain a weighted expansion of the byte originating from box 105 into a 32-bit word. The obtained word is placed in a register 108 (REG3), respecting the order of the multiplication coefficient line matrix.

As will be seen hereafter, such multiplications enable executing a first step of the columns mixing MIXCOLUMN of the AES algorithm to perform the polynomial multiplication. Most often, each column of the matrix resulting from the substitution box is multiplied by a square matrix having as values (bytes), in hexadecimal notation and for the ciphering: a=02, d=03, b=01, and c=01 for the first line, b, a, d, and c for the second line, c, b, a, and d for the third line and d, c, b, and a for the fourth line. For the deciphering, the hexadecimal values are a=0E, b=09, c=0D, and d=0B.

The word originating from register 108 is submitted to a rotation block 109 (ROTATE) which performs a circular permutation of the bytes of the input word and corresponds to a second step of the column mixing (MIXCOLUMNS) and of columns shifting (SHIFTROWS) of the AES algorithm. The rotation performed by block 109 depends on the byte selected by multiplexer 103. Blocks 109 and 103 are thus controlled by a same signal M of value 0, 1, 2, or 3, be it for the ciphering or for the deciphering.

Then, the word originating from the rotation block is combined (block 110, XOR) by XOR (logic bit-to-bit addition) with the word originating from register 101. The result of this combination is transmitted to an output register 111 (OREG). The output of register 111 is looped back onto the input of input register 101 to enable reusing an intermediary result in the same round transformation. Thus, register 101 contains either keys k, or data s.

According to the present invention, the operators illustrated in FIG. 4 are used sixteen times for each round transformation. In other words, by assimilating these operators to processing steps, the present invention provides a loop execution of these steps, sixteen times per round transformation with different data in registers 101 and 102, and specific selections of multiplexer 103, of the bytes of table 104 (control signal SEL 104), and of the bytes to which operation 109 is applied.

For each new line {$s_i(j,0)$, $s_i(j,1)$, $s_i(j,2)$, and $s_i(j,3)$} of bytes of matrix $S_i$ loaded into register 102, that is, every four loops, register 101 is loaded with a new key column {$k_i(0,1)$, $k_i(1,1)$, $k_i(2,1)$, and $k_i(3,1)$}, with j=1. For all the other loops, it contains the result of the preceding loop.

Of course, the entire matrix $S_i$ and the entire matrix $K_i$ are available upstream of registers 101 and 102. However, according to the presence invention, matrixes $S_i$ and $K_i$ are loaded column by column into respective registers 102 and 101.

The operation of the circuit of FIGS. 3 and 4 is illustrated by table 1 which describes, according to rank B of the loop (with B ranging between 1 and 16), the respective contents of the different registers IREG2, IREG1, REG3, and OREG and the respective output states O-103, O-105, and O-109 of blocks 103, 105, and 109, during a round transformation, that is, for the 16 successive loops. To ease the reading of the table, the following conventions have been adopted:

rank i of the round transformation has not been specified in the table since it relates to a same round. Further, ranks j and l of the lines and columns are indicated with no parentheses; in other words, $s_i(j,l)$ is written as "sjl", and $k_i(j,l)$ is written as "kjl";

the rank of the current loop has been designated as "B";

the bytes of a word are separated by commas the respective positions of the bytes in the registers containing 32-bit words correspond to positions 0, 1, 2, 3 from left to right;

respective values 0, 1, 2, and 3 of signal M indicate a selection of the first, second, third, and last byte starting from the left in register 102;

a byte is written as "s'" after substitution based on table SBOX 105;

sign "+" designates a bit-to-bit logic addition (XOR combination); and multiplication coefficients a and d equal to 02 and 03 have been respectively noted as 2 and 3 and multiplication coefficients b and c equal to 01 have been omitted.

TABLE 1

| B | M | IREG2 | IREG1 | O-103 | O-105 | REG3 |
|---|---|---|---|---|---|---|
| 1 | 0 | k00, k10, k20, k30 | s00, s10, s20, s30 | s00 | s'00 | 2s'00, s'00, s'00, 3s'00 |
| 2 | 1 | k00 + 2s'00, k10 + s'00, k20 + s'00, k30 + 3s'00 | s01, s11, s21, s31 | s11 | s'11 | 2s'11, s'11, s'11, 3s'11 |
| 3 | 2 | k00 + 2s'00 + 3s'11, k10 + s'00 + 2s'11, k20 + s'00 + s'11, k30 + 3s'00 + s'11 | s02, s12, s22, s32 | s22 | s'22 | 2s'22, s'22, s'22, 3s'22 |
| 4 | 3 | k00 + 2s'00 + 3s'11 + s'22, k10 + s'00 + 2s'11 + 3s'22, k20 + s'00 + s'11 + 2s'22, k30 + 3s'00 + s'11 + s'22 | s03, s13, s23, s33 | s33 | s'33 | 2s'33, s'33, s'33, 3s'33 |
| 5 | 0 | k01, k11, k21, k31 | s01, s11, s21, s31 | s01 | s'01 | 2s'01, s'01, s'01, 3s'01 |
| 6 | 1 | k01 + 2s'01, k11 + s'01, k21 + s'01, k31 + 3s'01 | s02, s12, s22, s32 | s12 | s'12 | 2s'12, s'12, s'12, 3s'12 |
| 7 | 2 | k01 + 2s'01 + 3s'12, k11 + s'01 + 2s'12, k21 + s'01 + s'12, k31 + 3s'01 + s'12 | s03, s13, s23, s33 | s23 | s'23 | 2s'23, s'23, s'23, 3s'23 |
| 8 | 3 | k01 + 2s'01 + 3s'12 + s'23, k11 + s'01 + 2s'12 + 3s'23, k21 + s'01 + s'12 + 2s'23, k31 + 3s'01 + s'12 + s'23 | s00, s10, s20, s30 | s30 | s'30 | 2s'30, s'30, s'30, 3s'30 |
| 9 | 0 | k02, k12, k22, k32 | s02, s12, s22, s32 | s02 | s'02 | 2s'02, s'02, s'02, 3s'02 |
| 10 | 1 | k02 + 2s'02, k12 + s'02, k22 + s'02, k32 + 3s'02 | s03, s13, s23, s33 | s13 | s'13 | 2s'13, s'13, s'13, 3s'13 |
| 11 | 2 | k02 + 2s'02 + 3s'13, k12 + s'02 + 2s'13, k22 + s'02 + s'13, k32 + 3s'02 + s'13 | s00, s10, s20, s30 | s20 | s'20 | 2s'20, s'20, s'20, 3s'20 |
| 12 | 3 | k02 + 2s'02 + 3s'13 + s'20, k12 + s'02 + 2s'13 + 3s'20, k22 + s'02 + s'13 + 2s'20, k32 + 3s'02 + s'13 + s'20 | s01, s11, s21, s31 | s31 | s'31 | 2s'31, s'31, s'31, 3s'31 |
| 13 | 0 | k03, k13, K23, k33 | s03, s13, s23, s33 | s03 | s'03 | 2s'03, s'03, s'03, 3s'03 |
| 14 | 1 | k03 + 2s'03, k13 + s'03, k23 + s'03, k33 + 3s'03 | s00, s10, s20, s30 | s10 | s'10 | 2s'10, s'10, s'10, 3s'10 |
| 15 | 2 | k03 + 2s'03 + 3s'10, k13 + s'03 + 2s'10, k23 + s'03 + s'10, k33 + 3s'03 + s'10 | s01, s11, s21, s31 | s21 | s'21 | 2s'21, s'21, s'21, 3s'21 |
| 16 | 3 | k03 + 2s'03 + 3s'10 + s'21, k13 + s'03 + 2s'10 + 3s'21, k23 + s'03 + s'10 + 2s'21, k33 + 3s'03 + s'10 + s'21 | s02, s12, s22, s32 | s32 | s'32 | 2s'32, s'32, s'32, 3s'32 |

| B | M | O-109 | OREG |
|---|---|---|---|
| 1 | 0 | 2s'00, s'00, s'00, 3s'00 | k00 + 2s'00, k10 + s'00, k20 + s'00, k30 + 3s'00 |
| 2 | 1 | 3s'11, 2s'11, s'11, s'11 | k00 + 2s'00 + 3s'11, k10 + s'00 + 2s'11, k20 + s'00 + s'11, k30 + 3s'00 + s'11 |
| 3 | 2 | s'22, 3s'22, 2s'22, s'22 | k00 + 2s'00 + 3s'11 + s'22, k10 + s'00 + 2s'11 + 3s'22, k20 + s'00 + s'11 + 2s'22, k30 + 3s'00 + s'11 + s'22 |
| 4 | 3 | s'33, s'33, 3s'33, 2s'33 | k00 + 2s'00 + 3s'11 + s'22 + s'33, k10 + s'00 + 2s'11 + 3s'22 + s'33, k20 + s'00 + s'11 + 2s'22 + 3s'33, k30 + 3s'00 + s'11 + s'22 + 2s'33 |
| 5 | 0 | 2s'01, s'01, s'01, 3s'01 | k01 + 2s'01, k11 + s'01, k21 + s'01, k31 + 3s'01 |
| 6 | 1 | 3s'12, 2s'12, s'12, s'12 | k01 + 2s'01 + 3s'12, k11 + s'01 + 2s'12, k21 + s'01 + s'12, k31 + 3s'01 + s'12 |

TABLE 1-continued

| | | | |
|---|---|---|---|
| 7 | 2 | s'23, 3s'23, 2s'23, s'23 | k01 + 2s'01 + 3s'12 + s'23, |
| | | | k11 + s'01 + 2s'12 + 3s'23, |
| | | | k21 + s'01 + s'12 + 2s'23, |
| | | | k31 + 3s'01 + s'12 + s'23 |
| 8 | 3 | s'30, s'30, 3s'30, 2s'30 | k01 + 2s'01 + 3s'12 + s'23 + s'30, |
| | | | k11 + s'01 + 2s'12 + 3s'23 + s'30, |
| | | | k21 + s'01 + s'12 + 2s'23 + 3s'30, |
| | | | k31 + 3s'01 + s'12 + s'23 + 2s'30 |
| 9 | 0 | 2s'02, s'02, s'02, 3s'02 | k02 + 2s'02, k12 + s'02, k22 + s'02, k32 + 3s'02 |
| 10 | 1 | 3s'13, 2s'13, s'13, s'13 | k02 + 2s'02 + 3s'13, k12 + s'02 + 2s'13, |
| | | | k22 + s'02 + s'13, k32 + 3s'02 + s'13 |
| 11 | 2 | s'20, 3s'20, 2s'20, s'20 | k02 + 2s'02 + 3s'13 + s'20, |
| | | | k12 + s'02 + 2s'13 + 3s'20, |
| | | | k22 + s'02 + s'13 + 2s'20, |
| | | | k32 + 3s'02 + s'13 + s'20 |
| 12 | 3 | s'31, s'31, 3s'31, 2s'31 | k02 + 2s'02 + 3s'13 + s'20 + s'31, |
| | | | k12 + s'02 + 2s'13 + 3s'20 + s'31, |
| | | | k22 + s'02 + s'13 + 2s'20 + 3s'31, |
| | | | k32 + 3s'02 + s'13 + s'20 + 2s'31 |
| 13 | 0 | 2s'03, s'03, s'03, 3s'03 | k03 + 2s'03, k13 + s'03, k23 + s'03, k33 + 3s'03 |
| 14 | 1 | 3s'10, 2s'10, s'10, s'10 | k03 + 2s'03 + 3s'10, k13 + s'03 + 2s'10, |
| | | | k23 + s'03 + s'10, k33 + 3s'03 + s'10 |
| 15 | 2 | s'21, 3s'21, 2s'21, s'21 | k03 + 2s'03 + 3s'10 + s'21, |
| | | | k13 + s'03 + 2s'10 + 3s'21, |
| | | | k23 + s'03 + s'10 + 2s'21, |
| | | | k33 + 3s'03 + s'10 + s'21 |
| 16 | 3 | s'32, s'32, 3s'32, 2s'32 | k03 + 2s'03 + 3s'10 + s'21 + s'32, |
| | | | k13 + s'03 + 2s'10 + 3s'21 + s'32, |
| | | | k23 + s'03 + s'10 + 2s'21 + 3s'32, |
| | | | k33 + 3s'03 + s'10 + s'21 + 2s'32 |

The 16 bytes of the output matrix are obtained by reading from output register 111 at the end of loops 4, 8, 12, and 16. The content of the register each time forms a column of the output state matrix. It can be seen that this matrix respects the AES algorithm.

It should be noted that at the last ciphering round, the circuit is controlled not to perform the steps of the column mixing operation (MIXCOLUMNS). Thus, multipliers 115 and 118 and rotation block 109 are controlled to be deactivated at the last ciphering round.

An advantage of the present invention is that the specific division of the operations reduces the size required to store the substitution box (SBOX) with respect to the precalculation of four tables.

The implementation of a ciphering round requires, for example, for instructions of sub-key word loading into register 101 and sixteen calls to the instructions required by the four steps (SHIFTROWS, SUBBYTES, MIXCOLUMNS, and ADDROUNDKEY) of the AES algorithm. As a variation, the number of cycles may be decreased by increasing the number of processing cells.

The above-described calculation instruction may of course be completed to be able to perform the deciphering. The adaptation of the circuit and of its controls to the deciphering is within the abilities of those skilled in the art based on the indications given hereabove.

According to a preferred embodiment of the present invention, the algorithm execution is protected against possible differential power analysis attacks (DPA) by masking of this execution by means of random numbers.

Figure 5:
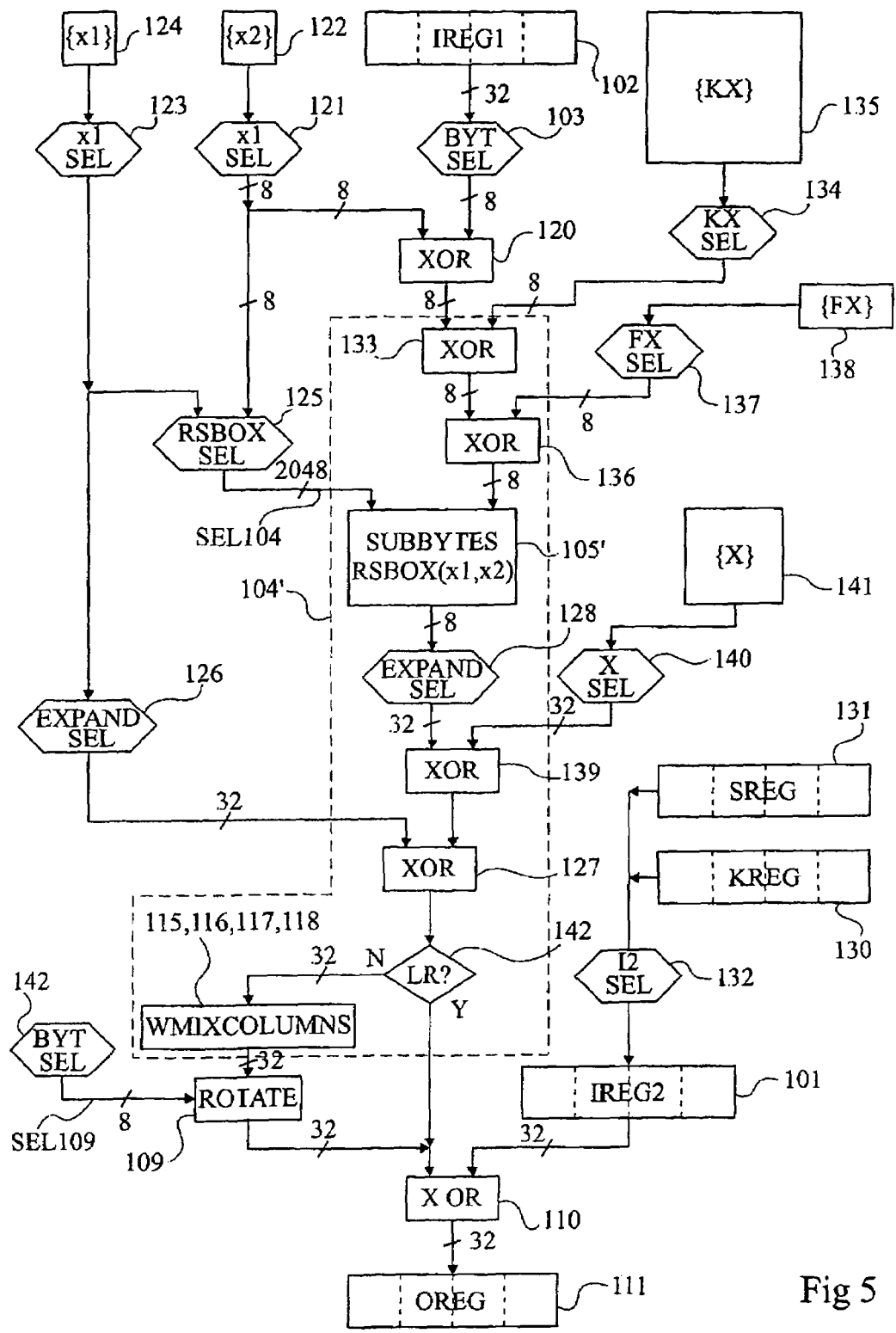
FIG. 5 very schematically illustrates in the form of blocks an embodiment of the present invention with a masking by random numbers.

FIG. 5 shows in the form of a flowchart such an embodiment of the present invention. This drawing shows the elements of FIGS. 3 and 4 and incorporates therein steps linked to the masking with random numbers. The following description relates more to a method flowchart than to a processor structure. However, as for the discussion of FIGS. 2 and 3, a step or operation and the hardware element executing this operation in the case of a state machine have been designated with the same reference numerals and are voluntarily confounded.

A first type of masking concerns two first random data x1 and x2 of the size of a byte selected from sets {x1} and {x2} of bytes (for example, matrixes of j*l bytes). This first type of masking is essentially used to mask substitution box SBOX. A second type of masking concerns random data of the size of a four-byte word selected from sets {X}, {KX}, and {FX} of bytes (for example, matrixes of j*l bytes). As will be seen hereafter, data FX and KX are exploited by bytes and data X are exploited by words to be conformal to the size of the manipulated data. This second type of masking is essentially used to preserve the subkey masking.

The first type of masking comprises the steps of introducing random data (bytes) between steps 103 and 104 (FIG. 3), into substitution box SBOX (step 105, FIG. 4), then of unmasking the results provided by step 105. Thus, an XOR-type combination (block 120) is provided, after the byte selection performed by multiplexer 103 (BYTE SEL), with a random byte x2 coming from a selector 121. Selector 121 selects a byte x2 from a matrix 122 ({x2}) of 16 bytes x2. Further, the substitution box, noted RSBOX, transmitted to block 105 takes into account not only this byte x2, but also preferentially a random byte x1 selected by a selector 123 from a 16-byte matrix 124 ({x1}). Table RSBOX is either calculated for each processed byte, or selected from a memory containing precalculated tables. Table RSBOX is selected (block 125, RSBOX SEL) according to the current values x1 and x2. Theoretically, there are 16 masking possibilities per round, that is, as a total (in the example of 128-bit keys, and thus of 10 rounds) 160 triplets (x1, x2, RSBOX). Preferably, to decrease the necessary storage space, quantities x1 and x2, and thus table RSBOX, remain identical for each ciphering (or deciphering), that is, for all the rounds of the algorithm. As a variation, quantities x1 and x2 are changed at each round (one triplet (x1, x2, RSBOX) per round). In a simplified embodiment, all the bytes x1 of matrix {x1} are identical and all the bytes of matrix {x2} are identical. In this case, table RSBOX is calculated only once for the entire ciphering.

Substitution box RSBOX, which is a function of random values x1 and x2, is calculated by respecting the following relation:

RSBOX($S_i$+x2)=SBOX($S_i$)+x1, where SBOX represents the substitution box of the algorithm which is desired to be masked and RSBOX designates the byte substitution function (SUBBYTES) adapted to the data masked by quantities x1 and x2. In other words, a new substitution box RSBOX is calculated based on table SBOX of the algorithm which is desired to be masked with values x1 and x2. For the calculation of table RSBOX, reference may be made to European patent application No 1379023 of the applicant.

For the manipulation of data X, FX, and RX, block 104' performing the substitution operation also comprises as compared to the embodiment of FIGS. 3 and 4 the following additional elements:
- an XOR function (block 133, XOR) combining the output byte of block 120 with a byte KX selected by a selector 134 (KX SEL) from a matrix 135 ({KX});
- an XOR function (block 136, XOR) combining the output byte of block 133 with a byte FX, selected by a selector 137 (FX SEL) from a matrix 138 ({FX}), the output of function 136 forming a first input of block 105' while the 2,048 bits of table RSBOX originating from block 125 form its selection input SEL 104; and an XOR function (block 139, XOR) combining the 32-bit word originating from expansion block 128 with a 32-bit word X, selected by a selector 140 (X SEL) from a matrix 142 ({X}).

The function of word X is to avoid that the recombination due to the following column mixing step annuls the masking by quantity x1. Word X is thus used to mask the columns. Accordingly, word X has the size (32 bits) of the data manipulated by the column mixing step and matrix {X} contains a number of words X equal to 4n (it should be reminded that n here designates the number of rounds of the AES algorithm, generally 10). Word X is a random quantity and a same set of four words X used for the first four loops of a round remains unchanged for the rest of the round. In other words, the four words X used in a round may be tracked by the code M (ranging between 0 and 3) corresponding to the signal of byte selection from register 102.

The selection of word X (block 140) is performed according to the ciphering round (index i), and to the byte concerned by the loop (index M). Assuming a matrix {X} containing different words for each ciphering round, a word $X_{i,M}$ is identified by indexes i and M. Word X is modified at most once per round and, at the last ciphering round, no word X is selected. This means that the output of block 128 crosses block 139 with no modification.

The function of byte FX is to annul the drift due to the introduction of words $X_M$. For simplification, it is assumed that the four bytes of a same word $X_M$ are identical and round index i is not taken into account. Then, matrix {FX} is a four-byte vector $FX_l$ (it should be reminded that l, ranging between 0 and 3, designates the column of the current byte in the state machine), the respective values of which are:

$FX_0 = aX_0 + dX_1 + cX_2 + bX_3;$ $FX_1 = bX_0 + aX_1 + dX_2 + cX_3;$ $FX_2 = cX_0 + bX_1 + aX_2 + dX_3;$ and $FX_3 = dX_0 + cX_1 + bX_2 + aX_3.$ Values a, b, c, and d correspond to the coefficients of the polynomial multiplication of the column mixture and "+" always designates a bit-to-bit logic addition (XOR). Thus, in the example of FIGS. 3 and 4 and of table 1, a=02, b=01, c=01, and d=03 for the ciphering (for the deciphering, a=0E, b=09, c=0D, and d=0B). Of course, the bytes of a same word $X_M$ may be different. In this case, the byte column must be taken into account in the above relations.

The selection of byte FX (block 137) is performed according to the ciphering round (index i) and to the byte concerned by the loop (index M). Assuming a matrix {FX} containing different bytes FX for each ciphering round, a byte FX is identified by the two indexes i and M. At the first ciphering round, no byte FX is selected. This means that the output of block 133 is directly processed by block 105'.

The function of byte KX is to preserve the masking of the sub-key bytes during their use by the algorithm. The size of matrix {KX} corresponds to the size of state matrix $S_i$, and thus to the size of sub-key $K_i$. Matrix KX can change for each sub-key (each turn) or be the same for the entire ciphering (deciphering).

The selection of byte KX (block 134) is performed according to the ciphering round (index i), to the byte concerned by the loop (index M), and to the rank of the loop (index B), and depends on the size of the state matrix (here, 128 bits). Assuming a matrix {KX} containing different bytes KX for each ciphering round, a byte KX is identified by three indexes i, r, and M, with r=(B+(B/4)) modulo 4.

Finally, value x1 undergoes an expansion (block 126, EXPAND SEL) to obtain a 32-bit word in which each byte is equal to x1. The obtained word is used to unmask the data resulting from the substitution. This word is combined by an XOR function (block 127, XOR) with the result of the byte substitution. On the side of block 104, the output byte of box 105' undergoes an expansion (block 128, EXPAND SEL) to obtain a 32-bit word in which the output byte of the table is reproduced four times identically.

The expansion, by identical reproduction of the input byte in the resulting word, provided at blocks 126 and 128, does not occur at the last ciphering round. At the last round, the input byte is reproduced in the byte of the output word corresponding to the position of the byte being processed in the loop (position M) and the other bytes are positioned at 0.

At the output of block 127, it is checked whether it is the last ciphering round (block 140—LR ?). If so (Y), steps 115 to 118 (WMIXCOLUMNS) and 109 are not executed and the result of block 127 is directly combined by block 110 with the content of register 101. If not (N), the two phases (symbolized by blocks WMIXCOLUMNS and ROTATE) of the column mixture are executed before the combination in block 110. The control signal of block 109 which, as appears from table 1, actually corresponds to the signal for selecting the byte to be processed in the loop, has been schematically shown as originating from a byte selection block (block 42—BYTE SEL).

To the right of FIG. 5, elements independent from the masking but useful to perform the transformations by means of the same processor (software or hardware), including in the embodiment of FIGS. 3 and 4, have been detailed. This corresponds to the selection of the bytes to be loaded into register 101. Register 101 is shown as supplied either by a key register 130 (KREG), or by an intermediary register 131 (SREG) into which the content of register 111 has been copied at the end of the preceding loop. A selector 132 (I2, SEL) enables selecting one or the other of registers 130 and 131 for transfer into register 101.

Although this has not been described in detail, the sub-keys provided by register 130 are masked by random data KX before introduction into this register. Thus, the bytes of the sub-keys are not used unmasked in the algorithm.

Of course, the present invention is likely to have various alterations and modifications which will readily occur to those skilled in the art. In particular, although the invention has been described in relation with an example of application to 128-bit state machines, it more generally applies to any Rijndael algorithm and the required adaptations are within the abilities of those skilled in the art based on the functional indications given hereabove.

Further, adapting the invention to a deciphering is within the abilities of those skilled in the art based on the indications provided for the ciphering.

Finally, the practical implementation of the present invention and especially the generation of adapted control signals and the step synchronization is within the abilities of those skilled in the art.

Having thus described at least one illustrative embodiment of the invention, various alterations, modifications, and improvements will readily occur to those skilled in the art. Such alterations, modifications, and improvements are intended to be within the scope of the invention. Accordingly, the foregoing description is by way of example only and is not intended as limiting. The invention is limited only as defined in the following claims and the equivalents thereto.

What is claimed is:

1. A processor for performing a plurality of rounds of ciphering or deciphering of an initial state matrix formed of a plurality of bytes of data to obtain a resulting matrix of a same size as the initial state matrix, each round using a matrix of bytes of ciphering or deciphering keys, the processor comprising:
   a first input register configured to contain a column of round input data bytes;
   an output register configured to contain a column of transformed round output data bytes or a column of intermediary data bytes;
   a second input register configured to contain either a column of key bytes, or the column of intermediary data bytes of the output register;
   a substitution element based on a substitution box table loaded into a memory, said substitution element configured to receive individual round input data bytes selected from the first register and to provide, for each individual round input data byte, a column of substituted bytes;
   a controllable permutation element configured to perform circular permutation of the column of substituted bytes provided by the substitution element, providing a permuted byte column; and
   an XOR element configured to perform XOR bit-to-bit combination of the permuted byte column provided by the permutation element with the content of the second register, resulting in the column of intermediary data bytes or transformed round output data bytes that is loaded into the output register.

2. The processor of claim 1, in which the second input register is configured to receive a column of key bytes on each loading of a new column of round input data bytes into the first register, and a column of intermediary data bytes otherwise.

3. The processor of claim 1, configured for operations performed by said substitution, permutation and XOR elements to be performed, at each round, as many times as there are bytes in the initial state matrix.

4. The processor of claim 1, in which said substitution element comprises:
   a first element configured to perform byte-by-byte substitution based on said substitution box table;
   a second element configured to expand a byte provided by said first element into a column of bytes; and
   a series of multiplication elements configured to perform byte-by-byte multiplication of the column of bytes provided by said second element.

5. The processor of claim 4, configured to deactivate said series of multiplication elements and said circular permutation element at the last of the plurality of rounds of ciphering or deciphering.

6. The processor of claim 1, further configured to mask execution of operations performed by the substitution element, the permutation element and/or the XOR element with at least one random quantity.

7. The processor of claim 6, comprising masking elements for combining, by an XOR function, an individual round input data byte received by the substitution element with at least one first byte-sized random number.

8. The processor of claim 7, in which said substitution element is configured to use a table calculated with a second byte-sized random number, the table being calculated such that, if the table is applied to a combination by XOR of an individual round input data byte with the second byte-sized random number, the result is equal to a combination by XOR of said first byte-sized random number with the result of applying a conventional Rijndael algorithm substitution table to the individual round input data byte.

9. The processor of claim 6, configured to mask the column of key bytes, before introduction into the second input register, by first random data of the size of a column of bytes, and to combine the individual round input data bytes by XOR with second random data equal to the first random data before introduction into the substitution element.

10. The processor of claim 9, configured to combine third random data by XOR with data within the substitution element, and to combine fourth random data by XOR with data at the substitution element's input.

11. The processor of claim 1, in which said substitution, permutation and XOR elements are at least partially software elements.

12. The processor of claim 1, in which said substitution, permutation and XOR elements are at least partially hardware elements.

13. The processor of claim 1, wherein the substitution element and the permutation element are configured to together perform SUBBYTES, MIXCOLUMNS and SHIFTROWS operations of a Rijndael algorithm.

14. A method performed by a processor comprising:
   selecting a first input byte from data to be ciphered or deciphered;
   replacing the first input byte with a first substitute byte using a Rijndael algorithm substitution table;
   replicating the first substitute byte to form a first column of replicated bytes;
   multiplying each replicated byte in the first column of replicated bytes by a corresponding number to form a first column of multiplied bytes;
   performing a circular permutation on the first column of multiplied bytes to form a first permuted column of bytes; and
   combining the first permuted column of bytes with a column of key bytes by XOR to form a first column of output bytes.

15. The method of claim 14, further comprising:
  selecting a second input byte from the data to be ciphered or deciphered;
  replacing the second input byte with a second substitute byte using the Rijndael algorithm substitution table;
  replicating the second substitute byte to form a second column of replicated bytes;
  multiplying each replicated byte in the second column of replicated bytes by a corresponding number to form a second column of multiplied bytes;
  performing a circular permutation on the second column of multiplied bytes to form a second permuted column of bytes; and
  combining the second permuted column of bytes with the first column of output bytes by XOR to form a second column of output bytes.

16. The method of claim 14, further comprising selecting the corresponding number by which to multiply each replicated byte such that the replacing, replicating, multiplying and performing the circular permutation together perform SUBBYTES, MIXCOLUMNS and SHIFTROWS operations of the Rijndael algorithm.

17. The method of claim 14, further comprising masking the first input byte, the first column of replicated bytes and/or the column of key bytes with at least one random quantity.

18. The method of claim 17, further comprising modifying the substitution table used to replace the first input byte to offset the masking.

19. A memory device encoded with processor-executable instructions that, when executed, perform a method comprising:
  selecting a first input byte from data to be ciphered or deciphered;
  replacing the first input byte with a first substitute byte using a Rijndael algorithm substitution table;
  replicating the first substitute byte to form a first column of replicated bytes;
  multiplying each replicated byte in the first column of replicated bytes by a corresponding number to form a first column of multiplied bytes;
  performing a circular permutation on the first column of multiplied bytes to form a first permuted column of bytes; and
  combining the first permuted column of bytes with a column of key bytes by XOR to form a first column of output bytes.

20. The memory device of claim 19, wherein the method further comprises:
  selecting a second input byte from the data to be ciphered or deciphered;
  replacing the second input byte with a second substitute byte using the Rijndael algorithm substitution table;
  replicating the second substitute byte to form a second column of replicated bytes;
  multiplying each replicated byte in the second column of replicated bytes by a corresponding number to form a second column of multiplied bytes;
  performing a circular permutation on the second column of multiplied bytes to form a second permuted column of bytes; and
  combining the second permuted column of bytes with the first column of output bytes by XOR to form a second column of output bytes.

21. The memory device of claim 19, wherein the method further comprises selecting the corresponding number by which to multiply each replicated byte such that the replacing, replicating, multiplying and performing the circular permutation together perform SUBBYTES, MIXCOLUMNS and SHIFTROWS operations of the Rijndael algorithm.

22. The memory device of claim 19, wherein the method further comprises masking the first input byte, the first column of replicated bytes and/or the column of key bytes with at least one random quantity.

23. The memory device of claim 22, wherein the method further comprises modifying the substitution table used to replace the first input byte to offset the masking.

24. A hardware unit comprising:
  a selecting element configured to select an input byte from data to be ciphered or deciphered;
  a substitution element configured to receive the input byte from the selecting element, to replace the input byte with a substitute byte using a Rijndael algorithm substitution table, to replicate the substitute byte to form a column of replicated bytes, and to multiply each replicated byte in the column of replicated bytes by a corresponding number to form a column of multiplied bytes;
  a permutation element configured to perform a circular permutation on the column of multiplied bytes to form a permuted column of bytes; and
  an XOR element to combine by XOR the permuted column of bytes with a column of key bytes, or with a previous column of output bytes, to form a current column of output bytes.

25. The hardware unit of claim 24, wherein the substitution element and the permutation element are configured to together perform SUBBYTES, MIXCOLUMNS and SHIFTROWS operations of the Rijndael algorithm.

26. The hardware unit of claim 24, further comprising masking elements configured to mask the input byte, the column of replicated bytes, the column of key bytes and/or the previous column of output bytes with at least one random quantity.

27. The hardware unit of claim 26, wherein the substitution table is modified to offset the masking.

* * * * *

UNITED STATES PATENT AND TRADEMARK OFFICE
CERTIFICATE OF CORRECTION

| | | |
|---|---|---|
| PATENT NO. | : 8,102,997 B2 | Page 1 of 1 |
| APPLICATION NO. | : 11/547195 | |
| DATED | : January 24, 2012 | |
| INVENTOR(S) | : Yannick Teglia et al. | |

It is certified that error appears in the above-identified patent and that said Letters Patent is hereby corrected as shown below:

Col. 1, line 34 should read:
by Springer-Verlag (ISBN 3-540-42580-2) and to the AES Col. 14, line 11 should read:
series of multiplication elements and said permuta- Signed and Sealed this
Thirteenth Day of March, 2012

David J. Kappos
*Director of the United States Patent and Trademark Office*